United States Patent
Walker et al.

(10) Patent No.: US 10,996,963 B2
(45) Date of Patent: May 4, 2021

(54) INTEGRATING WEB-BASED TUTORIALS INTO WEBSITES USING A TAG MANAGER

(71) Applicant: Adobe Inc., San Jose, CA (US)

(72) Inventors: Jordan Walker, Lehi, UT (US); Andrew Watanabe, Saratoga Springs, UT (US); Alan Wilson, Cedar Hills, UT (US); Kevin Wilson, Saratoga Springs, UT (US)

(73) Assignee: ADOBE INC., San Jose, CA (US)

( * ) Notice: Subject to any disclaimer, the term of this patent is extended or adjusted under 35 U.S.C. 154(b) by 90 days.

(21) Appl. No.: 16/203,743

(22) Filed: Nov. 29, 2018

(65) Prior Publication Data

US 2020/0175096 A1 Jun. 4, 2020

(51) Int. Cl.
| | |
|---|---|
| G06F 40/14 | (2020.01) |
| G06F 9/451 | (2018.01) |
| G06F 16/958 | (2019.01) |
| G06F 16/955 | (2019.01) |
| G06F 40/134 | (2020.01) |
| G06F 40/117 | (2020.01) |

(52) U.S. Cl.
CPC ............ *G06F 9/453* (2018.02); *G06F 16/955* (2019.01); *G06F 16/958* (2019.01); *G06F 40/117* (2020.01); *G06F 40/134* (2020.01); *G06F 40/14* (2020.01)

(58) Field of Classification Search
CPC ........ G06F 40/14; G06F 40/143; G06F 9/453; G06F 40/134; G06F 40/117; G06F 16/958; G06F 16/955
See application file for complete search history.

(56) References Cited

U.S. PATENT DOCUMENTS

| | | | |
|---|---|---|---|
| 10,074,104 B2* | 9/2018 | Brewer | G06F 9/453 |
| 2007/0061221 A1* | 3/2007 | Higgins | G06Q 40/02 705/26.8 |
| 2008/0254434 A1* | 10/2008 | Calvert | G09B 7/00 434/350 |
| 2012/0323704 A1* | 12/2012 | Steelberg | G06Q 30/0268 705/14.73 |
| 2014/0298162 A1* | 10/2014 | Cohen | G06F 40/103 715/234 |

* cited by examiner

*Primary Examiner* — Keith D Bloomquist
(74) *Attorney, Agent, or Firm* — Kilpatrick Townsend & Stockton LLP (57) ABSTRACT

Systems and methods for deploying tutorial content to websites via tag management systems are disclosed. In an example, a tutorial deployment application accesses a content segment and a condition for displaying the content segment. The application generates a tutorial object including code to display the content segment. The application integrates the tutorial object into the set of runtime tags by selecting a tag from a set of runtime tags that control operations of a website and links the tag with the tutorial object. Based on a performance of the operation, the condition is met, and the tag is executed, causing the tutorial object to be loaded and executed by the website and the content segment to be displayed by the website.

19 Claims, 6 Drawing Sheets

INTEGRATING WEB-BASED TUTORIALS INTO WEBSITES USING A TAG MANAGER

TECHNICAL FIELD

This disclosure relates generally to content deployment tools for web applications. More specifically, but not by way of limitation, this disclosure relates to deploying tutorial content to websites by way of a tag manager.

BACKGROUND

Application software designers and programmers often create tutorials for application software. These tutorials help an end user learn how to use the application software or perform a specific task. Sometimes these tutorials are translated into web-based content, e.g., hyper-text markup language (HTML), that can be deployed in an online environment and viewed using web-browsers.

But existing solutions require modification of code stored on the website, a requirement that makes the development process more cumbersome and implies technical expertise on the part of the designer. Additionally, existing solutions for tutorial development and deployment require access to the target website. As such, these solutions often require that tutorial content be developed by the same entity that maintains the website.

Accordingly, new solutions are needed for deploying tutorial content to websites without direct modification of the website code.

SUMMARY

Systems and methods are disclosed herein for deploying tutorial content to websites operating with tag managers. In an example, an application accesses tutorial content including a content segment and a condition for displaying the content segment. The application generates a tutorial object including code to display the content segment. The application further integrates the tutorial object into the set of runtime tags by selecting a tag from a set of runtime tags that control operations of a website and links the tag with the tutorial object, where a performance of one of the operations is the condition and causes an execution of the tag to occur and an execution of the tag causes the tutorial object to be loaded and executed by the website and the content segment to be displayed on a web page of the website. The application deploys the set of runtime tags to the website.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Embodiments of the present disclosure involve developing interactive tutorial content for web-based applications and deploying the content to websites by using a tag manager. Tag managers use tags, or pieces of code, embedded in certain web pages to cause actions to be performed or metrics to be gathered. Certain embodiments use a tag manager to create code objects that implement different tutorial segments and integrate the objects into tags used by a website, which serve the code objects to a web browser based on the tags being executed at runtime. By using a tag manager to deploy and update tutorial content, these embodiments can simplify generation of tutorial content and facilitate integration of the tutorial content with website analytics and other website content.

In an example, a tutorial deployment tool creates code (e.g., JavaScript) for tutorial content that is designed to help users configure a web-based application. The tutorial includes a first segment that assists a user to register a profile and a second segment that assists a user in configuring a set of parameters. Each tutorial segment can be displayed if a condition based on one or more operations is met. For instance, the first segment could be conditioned to execute if a detected user is a brand new user, and the second segment could be conditioned to execute if a user moves his or her mouse over one of a set of fields that receive the parameters.

Continuing with this example, the tutorial deployment tool responds to a request to publish the tutorial content on a website by using a tag manager to integrate the tutorial content into a set of runtime tags, which are located at different positions on the web page. To do so, the tutorial deployment tool selects a first tag that is executed based on a new user being detected and links the first tag with the first tutorial segment. The tutorial deployment tool also selects a second tag that is executed if a computing system detects a user input directed to a field. The tutorial deployment tool links the second tag with the second segment. In this manner, the tutorial deployment tool uses tags to ensure that the tutorial content is displayed based on the conditions originally specified when the content is integrated with objects such website analytics. The tag manager can therefore conditionally serve the tutorial content, other website content, and analytics content to an end user accessing the website.

Certain embodiments provide technical improvements to internet-based content delivery systems, such as web servers and web browsers. Internet-based content delivery systems present unique resource-allocation challenges, such as consumption of computing resources (e.g., memory, processing cycles, network bandwidth) consumed by loading content. These computing resources are consumed unnecessarily in cases where web content (e.g., a tutorial object) is automatically loaded without regard to contexts specific to a certain user or device. In one example, this internet-centric resource consumption is improved by using a tag manager that employs a set of rules, thereby limiting the loading of content at runtime to those tutorial segments to which a rule applies or for which a condition is met. For instance, a tag manager of a web server can detect a first time visitor of a website and cause tutorial content to be loaded, but avoid causing the loading of the content for a repeat visitor to the website. Similarly, disclosed systems can cause the loading of appropriate tutorial content that corresponds to a specific part of a web application. Deploying interactive tutorial content to websites using a tag manage can therefore reduce unnecessary resource consumption (e.g., memory resources and page load times), especially on mobile devices.

In another example, the arrangement of a tutorial deployment tool in conjunction with a tag manager provides technical improvements to a website's operation that address issues with conventional arrangements of tutorial tools and web components. For instance, unlike existing techniques, certain embodiments involve deploying tutorial objects in conjunction with a tag manager. This use of a tag manager component for deploying tutorial objects can integrate interactive tutorial content seamlessly with other dynamically-loaded website content in a manner that would be infeasible with existing techniques.

Certain Definitions

As used herein, "tag" indicates software code or metadata in a web page that, when executed or processed, satisfies a condition and can cause one or more actions to be performed. A tag can include one or more properties that indicate an action to be performed or a data structure to be updated.

As used herein, "tag manager" or "tag management system" indicates a system or an application that uses one or more tags to cause the loading of an object that corresponds to content (e.g., tutorial content) or analytics tracking in a web page. A tag manager can use a set of rules, or conditions, to evaluate whether a particular object should be dynamically loaded by a web browser.

As used herein, "object" or "code" refers to a group of instructions that cause an action to be performed.

As used herein, "content" refers to content that can be displayed on a web page. Examples of content include text, images, interactive content, animations, and videos.

Figure 1:
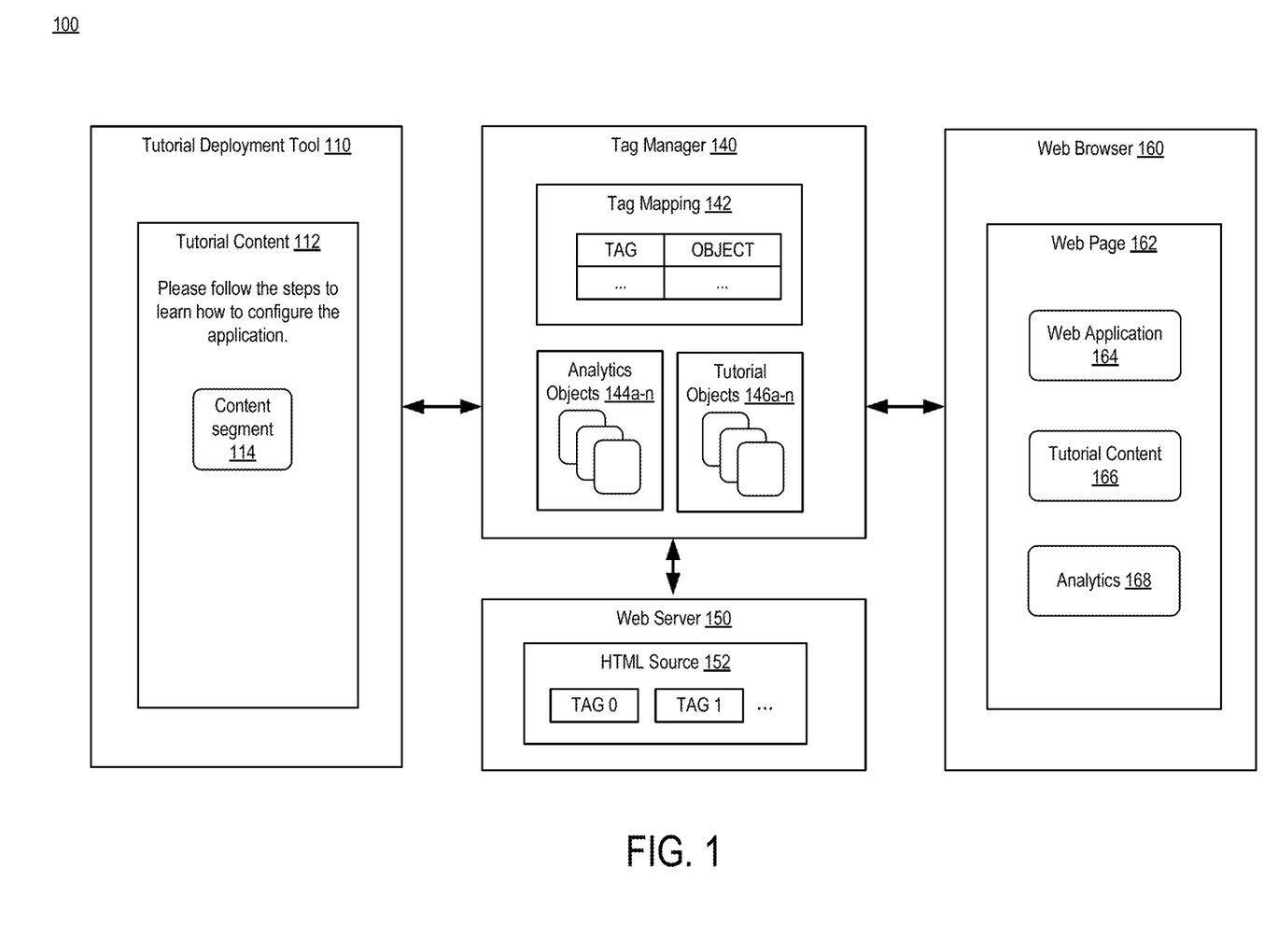
FIG. 1 depicts an example of tutorial deployment environment, according to an embodiment of the present disclosure.

Turning now to the Figures, FIG. 1 depicts an example of tutorial deployment environment, according to an embodiment of the present disclosure. FIG. 1 depicts tutorial deployment environment 100, which includes tutorial deployment tool 110, tag manager 140, web server 150, and web browser 160. Tutorial deployment tool 110, tag manager 140, and web server 150 can be implemented by or more computing devices, such as computing device 600 discussed with respect to FIG. 6.

Tutorial deployment tool 110 is configured to create and deploy tutorial content 112 by using tag manager 140, causing tutorial content 112 to be associated with one or more tags in HTML source 152 served by web server 150. Examples of tutorials include help pages, how-to guides, and interactive assistance to help users with various aspects of a user interface or a web application. Web server 150 serves Hyper Text Markup Language (HTML) source 152 to web browser 160 for rendering. If the satisfaction of a condition on web page 162 causes a tag to be executed, web server 150 uses tag manager 140 to select content corresponding to the tag (e.g., tutorial, analytics data, or other object) and provides the content to web browser 160.

In an example, tutorial deployment tool 110 accesses tutorial content 114 and creates a corresponding object that includes code implementing tutorial content 114. Objects can be implemented in any programming or scripting language. Example languages include JavaScript Object Notation (JSON) files or Python. The development of tutorial content is discussed further with respect to FIG. 2.

To deploy tutorial content 114, tutorial deployment tool 110 provides the object to tag manager 140. Tag manager 140 maps objects to tags based on identified conditions. Execution of a tag satisfies a condition and causes an action to be performed such as causing the loading of an object in a web page. Each tag is part of HTML source 152 and can have an associated location within HTML source 152. Examples of tag implementations are Cascading Style Sheet (CSS) selectors or data structures.

Upon receiving an object, tag manager 140 integrates the object into a set of tutorial objects 146a-n, and optionally, analytics objects 144a-n used to implement analytics functionality for web page 162. Tag manager 140 creates tag mapping 142, which includes multiple entries, each entry linking a tutorial object 146a-n and/or an analytics object 144a-n to a tag present in HTML source 152. Further details are discussed further with respect to FIG. 3.

Continuing the example, web browser 160 connects to web server 150 and loads web page 162, including web application 164 and analytics 168. Upon executing a tag embedded in web page 162, web browser 160 requests, loads, and executes an object that is linked to the tag and causes the tutorial content 166 to be loaded.

Figure 2:
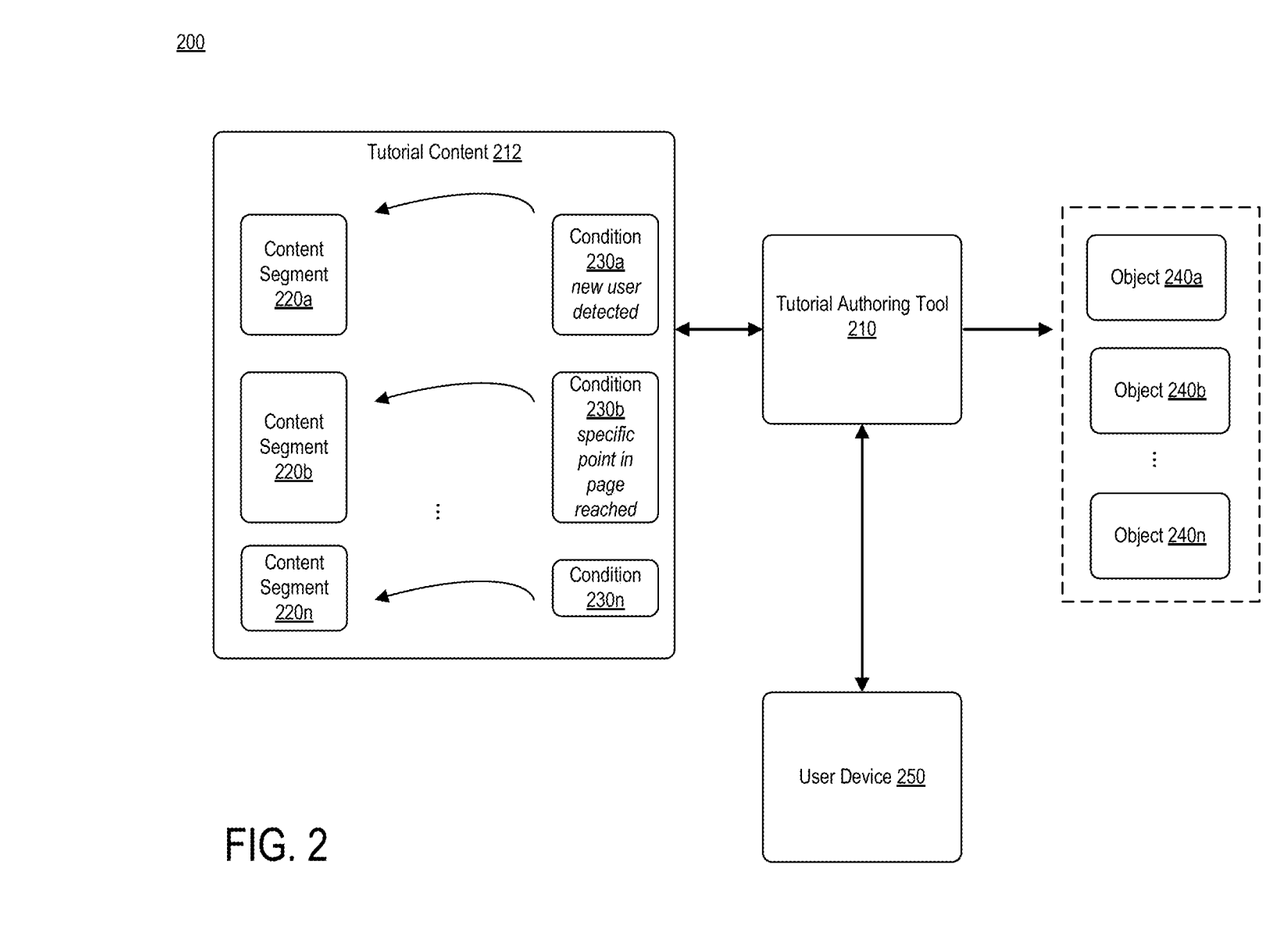
FIG. 2 depicts an example of creating interactive tutorial objects from a tutorial, according to an embodiment of the present disclosure.

FIG. 2 depicts an example of creating interactive tutorial objects from a tutorial, according to an embodiment of the present disclosure. FIG. 2 depicts tutorial development environment 200, which includes tutorial content 212, tutorial deployment tool 210, objects 240a-n, and user device 250. Tutorial content 212 includes content segments 220a-n and conditions 230a-n.

Tutorial deployment tool 210 is an example of the tutorial deployment tool 110. Tutorial deployment tool 210 can be implemented as a desktop application, e.g., on Windows, Linux, or Mac, or as a web-based application. Tutorial deployment tool 210 connects to user device 250, which can be any kind of interactive device. Examples of interactive devices include mice, keyboards, and smart phones. Tutorial deployment tool 210 receives commands from user device 250, for example commands to draw, add text, link tutorial content with conditions, and publish the tutorial content to web page 162.

In an example, tutorial deployment tool 210 receives input from an interactive device used by a designer to create content segments 220a-n. Based on further input from an interactive device, the tutorial deployment tool 210 associates content segment 220a with condition 230a and content segment 220b with condition 230b. As depicted, condition 230a is the detection of a new user and condition 230b is met if a specific point in the web page is reached. Examples of conditions include a new login to the website, a new visitor detected, a user accessing a particular URL, clicking a button, or a web page being loaded. Conditions can also include Document Object Model (DOM) events such as mouse events (e.g. mouse-overs) and keyboard events (pressing a key or sequence of keys).

Upon receiving a command from user device 250, tutorial deployment tool creates objects 240a-n, corresponding to content segments 220*a-n* and conditions 230*a-n*. For example, object 240*a* includes object code for generating content segment 220*a* and information about the corresponding condition 230*a*. When executed, a particular object 240*a-n* implements corresponding tutorial content. In another embodiment, tutorial deployment tool 210 outputs conditions 230*a-n* separately from object 240*a-n*.

Figure 3:
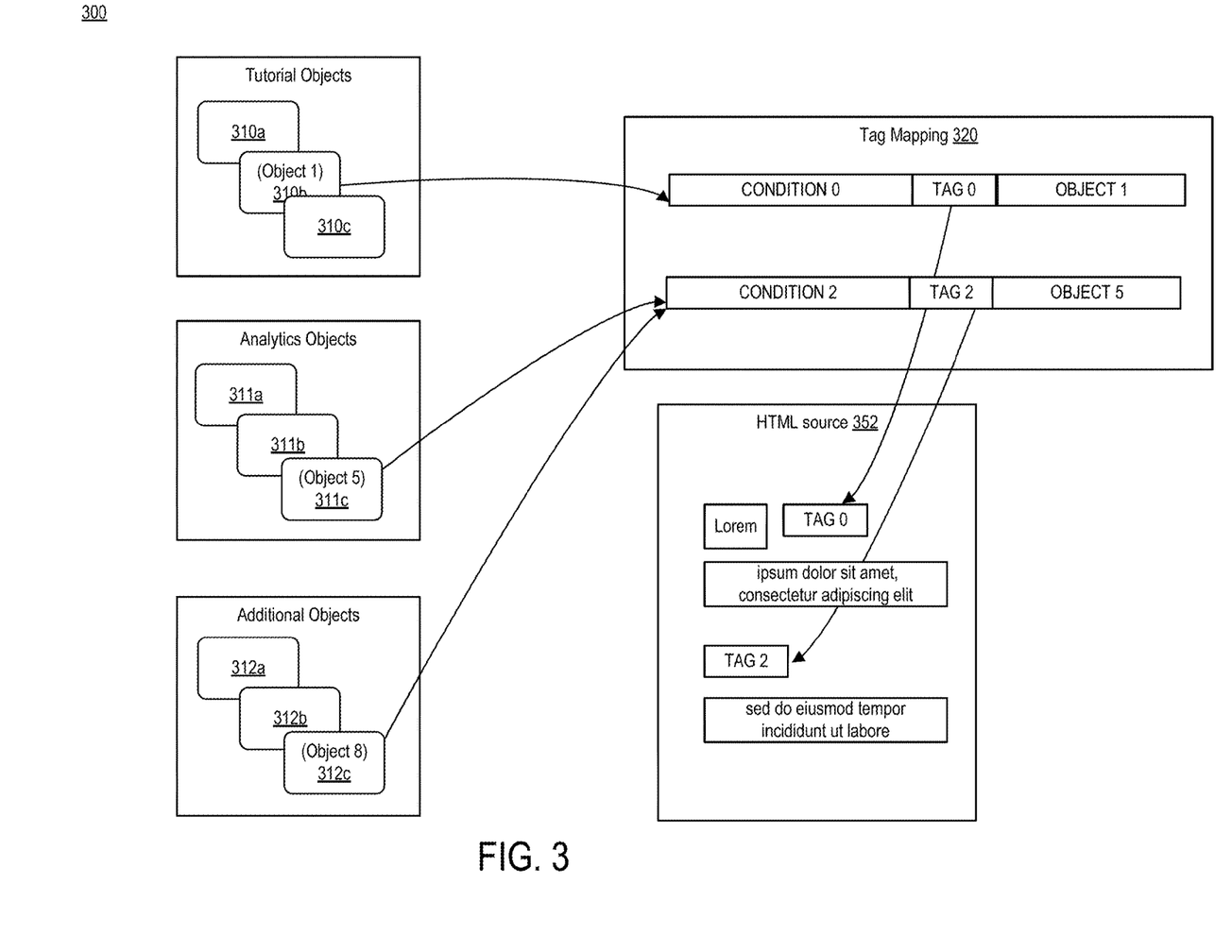
FIG. 3 depicts an example of deploying interactive tutorial objects into an example of tag based management system, according to an embodiment of the present disclosure.

FIG. 3 depicts an example of deploying interactive tutorial objects into an example of tag based management system, according to an embodiment of the present disclosure. FIG. 3 depicts deployment environment 300, which includes tutorial objects 310*a-n*, analytics objects 311*a-c*, additional objects 312*a-c*, tag mapping 320, and HTML source 352. While three objects of each type are shown for illustrative purposes, any number of objects is possible. In some cases, tutorial deployment tool 110 can communicate with and control tag manager 140 via an Application Programming Interface (API).

Tutorial objects 310*a-c*, analytics objects 311*a-c*, and additional objects 312*a-c* can be created by tutorial deployment tool 110 or by another application. For example, analytics objects 311*a-c* can be generated by an external analytics tool. Examples of additional objects include objects that implement a web application or related content.

Tutorial deployment tool 110 integrates tutorial objects 310*a-c*, analytics objects 311*a-c*, and additional objects 312*a-c* into tag manager 140 by creating entries in tag mapping 320 for each object. Each entry links an object to a particular tag contained in HTML source 352 based on the tag matching the condition corresponding to the object. For each object, tag manager 140 determines the associated condition (if any) and selects a tag that, if executed, will cause the condition to be satisfied.

For example, tag manager 140 determines that tutorial object 310*c* (object 1) is associated with a condition (condition 0) that is satisfied if tag 0 is executed. Tag manager 140 maps tag 0 to object 1. Similarly, tag manager 140 determines that analytics object 311*c* (object 5) and additional object 312*c* (Object 8) is associated with a condition (condition 2) that is satisfied if tag 2 is executed and associates tag 2 with objects 8 and 5.

Figure 4:
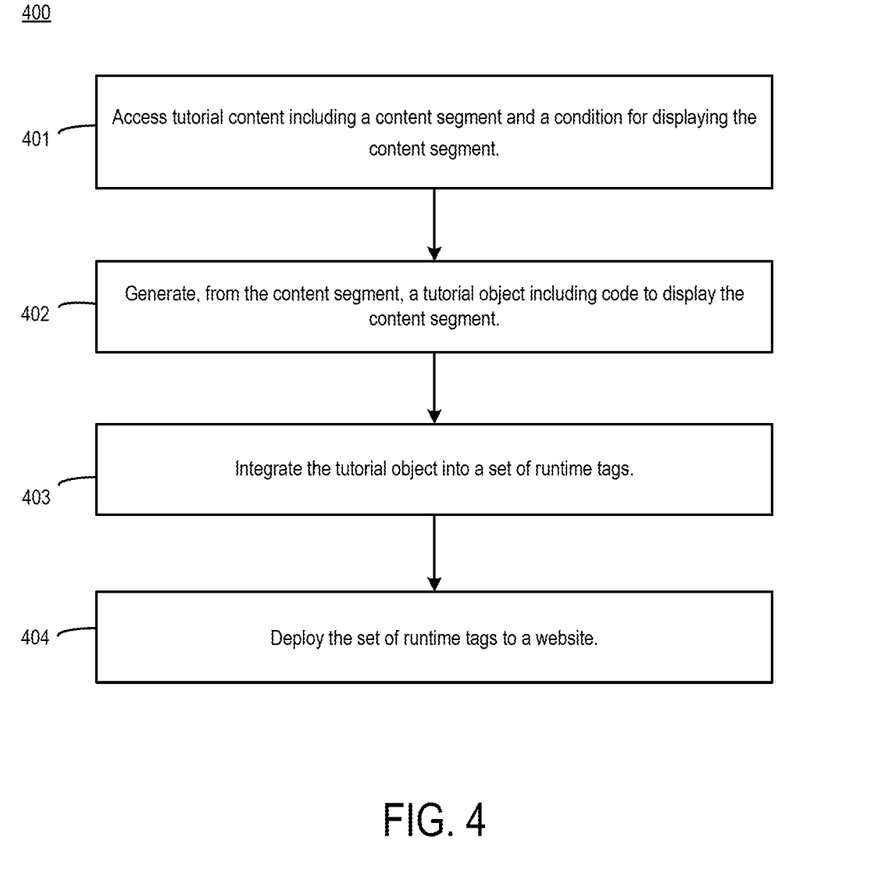
FIG. 4 depicts an example of a method for deploying interactive tutorial content into a tag manager, according to an embodiment of the present disclosure.

FIG. 4 depicts an example of a method 400 for deploying interactive tutorial content into a tag manager, according to an embodiment of the present disclosure. One or more of tutorial deployment tool 110, tag manager 140, or web browser 160 can implement method 400.

At block 401, method 400 involves accessing tutorial content including a content segment and a condition for displaying the content segment. Tutorial deployment tool 110 accesses tutorial content 112 from a storage device such as memory or a disk. In other cases, tutorial deployment tool 110 creates tutorial content 112 by receiving commands from a user device.

Tutorial content 112 can include display parameters such as alignment or anchor position that specify a particular positioning on web page 162. Similarly, tutorial content 112 can include a description or other metadata that can be used by web browser 160.

At block 402, method 400 involves generating, from the content segment, a tutorial object comprising code to display the content segment. Tutorial deployment tool 110 generates, for each content segment, a corresponding object that implements the segment. For example, tutorial deployment tool 110 creates interactive content including images and text and configures user interface elements based on input received from a user device. Based on further input from the designer, tutorial deployment tool 110 divides the content into several different segments. Tutorial deployment tool 110 converts each segment into code that implements the respective segment.

At block 403, method 400 involves integrating the tutorial object into the set of runtime tags. Tutorial deployment tool 110 integrates the tutorial object by selecting a tag from a set of runtime tags and by linking the tag with the tutorial object, thereby creating tag mapping 142. More specifically, tutorial deployment tool 110 selects a tag that controls an operation of a website such that if an operation is performed on the site, the tag is executed and the condition corresponding to the tutorial object is satisfied.

At runtime of the website, tag mapping 142 ensures that the correct object is passed to web browser 160, loaded, and executed, causing the corresponding content segment to be displayed on web page 162. By causing the correct object to be loaded dynamically based on if a tag causes a condition corresponding to the object to be met, tutorial deployment tool 110 saves computing resources in web browser 160. Conditions can be triggered by any events that can occur on a website such as an HTML event or an Document Object Model (DOM) event. JavaScript can be used to handle triggering of an event.

HTML events happen to HTML elements. A non-limiting list of HTML events is: abort, afterprint, animationend, animationiteration, animationstart, beforeprint, beforeunload, blur, canplay, canplaythrough, change, click, contextmenu, copy, cut, dblclick, drag, dragend, dragenter, dragleave, dragover, dragstart, drop, durationchange, ended, error, focus, focusin, focusout, fullscreenchange, fullscreenerror, hashchange, input, invalid, keydown, keypress, keyup, load, loadeddata, loadedmetadata, loadstart, message, mousedown, mouseenter, mouseleave, mousemove, mouseover, mouseout, mouseup, mousewheeloffline, online, open, pagehide, pageshow, paste, pause, play, playing, popstateprogress, ratechange, resize, reset, scroll, search, seeked, seeking, select, show, stalled, storagesubmit, suspend, timeupdate, toggle, touchcancel, touchend, touchmove, touchstart, transitionend, unload, volumechange, waiting, and wheel.

Other examples of conditions include a button click, an HTML page finishing loading, an HTML input field is changed, an HTML button was clicked, a mouse-over, and an amount of time that a user has spent on the page (e.g., an elapsed since a user browsed to the page).

In an embodiment, tag manager 140 can integrate other content, such as web applications or analytics functionality, and cause the conditional execution of the content according to tag mapping 142. For example, tag manager 140 accesses an application object that includes an application segment and an additional condition for displaying the application segment. For example, the application segment can be conditioned to load and execute only for certain users. Tag manager 140 integrates the application object by selecting an additional tag from the set of runtime tags and linking the additional tag with the application object.

In some cases, application on which a given tutorial is based is integrated into the set of runtime tags along with the tutorial content. An example of an application is a web based application for providing video services. The corresponding tutorial could be designed to help a user or system administrator configure the web-based application.

In a further embodiment, tag manager 140 integrates analytics functionality into a website. Analytics functionality involves collecting data such as a number of page views, user segments, or user demographics. Tag manager 140 accesses an analytics object and links an additional tag with the analytics object such that execution of the additional tag causes the analytics object to be loaded and executed by the website. Additionally, the execution can cause a data object to be stored with analytics data such as a number of times the tag was executed, indicating a number of page views.

At block 404, method 400 involves deploying the set of runtime tags to a website. Tag manager 140 deploys tag mapping 142 such that web server 150 and tag manager 140 facilitate dynamic loading of objects to web browser 160. Deployment may vary based on the configuration of the website. For example, deploying can involve passing of tags and objects from tag manager 140 to web server 150. In other cases, web server 150 and tag manager 140 can execute on the same computing device or be part of the same application such that deployment may involve changing a configuration of the objects to an active state.

Figure 5:
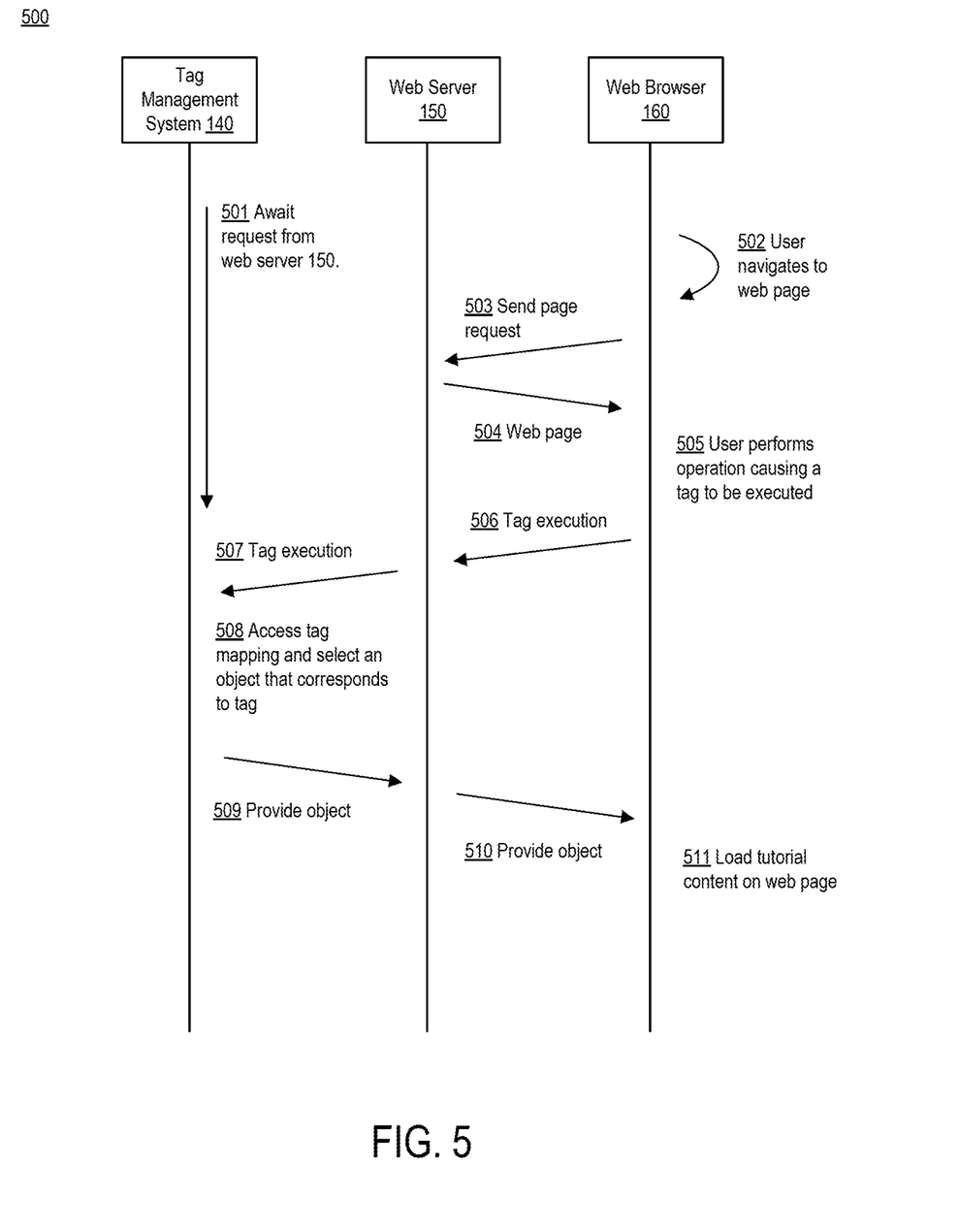
FIG. 5 depicts an example of dynamically loading tutorial content into a web page, according to an aspect of the present disclosure.

FIG. 5 depicts an example of dynamically loading tutorial content into a web page, according to an aspect of the present disclosure. FIG. 5 includes a flow diagram 500, which depicts tag manager 140, web server 150, and web browser 160. As depicted, certain operations are performed by tag manager 140 and others by web server 150. However, such operations can be performed by one or more of tutorial deployment tool 110, tag manager 140, or web server 150, which can be connected by one or more data networks.

At block 501, tag manager 140 awaits a request from web server 150.

At block 502, a user device causes web browser 160 to navigate to web page 162. For example, a user enters a URL into web browser 160. In turn, web browser 160 accesses the URL, looks up the Internet Protocol (IP) address of web server 150 and contacts web server 150. In response, at block 503, web browser 160 transmits a request for HTML source 152 to web server 150. Standard protocols can be used such as Hypertext Transfer Protocol (HTTP) or Hypertext Transfer Protocol Secure (HTTPS). At block 504, web server 150 transmits HTML source 152 to web browser 160. HTML source 152 can be transmitted in whole, or in segments. Any related content such as images or external content can be transmitted separately from HTML source 152.

At block 505, the user device performs an operation that causes a tag to be executed, such as accessing a particular location within the web page. Web browser 160 executes the tag, determining any links or properties inside the tag. The properties can indicate the action that web browser 160 should perform, e.g., contacting web server 150 with a notification that the tag was executed or accessing a data structure (e.g., to maintain analytics data).

At block 506, web browser 160 sends a notification to web server 150 that the tag was executed, including any properties of the tag. Using properties within the tag, web browser 160 transmits a notification that the tag was executed to web server 150. At block 507, web server 150 forwards the notification, including any properties, to tag manager 140.

At block 508, tag manager 140 accesses tag mapping 142 and uses the received properties to determine that one or more objects that correspond to the tag received at block 507. At block 509, the tag manager 140 provides the object to web server 150, which in turn provides the object to web browser 160 at block 510.

At block 511, web browser 160 loads and executes the object, which causes the corresponding tutorial content to be loaded on web page 162. Loading the object can include loading any code (e.g., JavaScript) or images that are contained within or referenced by the object. The user device can view the content associated with the object and interact with the object.

Figure 6:
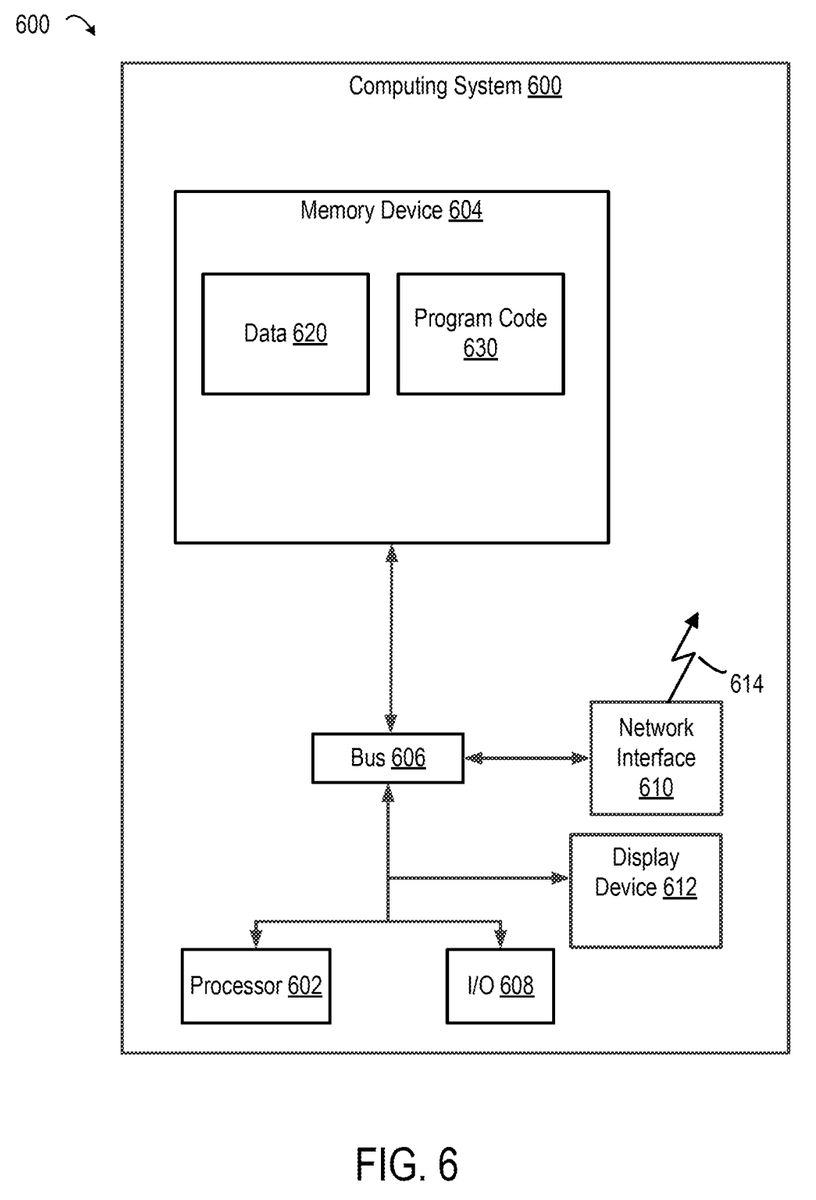
FIG. 6 depicts an example of a computing system for deploy tutorial content into a tag manager, according to an embodiment of the present disclosure.

FIG. 6 depicts an example of a computing system for deploying tutorial content into a tag manager, according to an embodiment of the present disclosure. Computing device 600 can implement tutorial deployment tool 110, tag manager 140, or web server 150. Any suitable computing system may be used for performing the operations described herein. The depicted example of a computing device 600 includes a processor 602 communicatively coupled to one or more memory devices 604. The processor 602 executes computer-executable program code 630 stored in a memory device 604, accesses data 620 stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices or cores, including a single processing device. The functionality of the computing device may be implemented in hardware, software, firmware, or a combination thereof.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C #, Visual Basic, Java, or scripting language.

The computing device 600 may also include a number of external or internal devices, such as input or output devices. For example, the computing device 600 is shown with one or more input/output ("I/O") interfaces 608. An I/O interface 608 can receive input from input devices or provide output to output devices. One or more busses 606 are also included in the computing device 600. The bus 606 communicatively couples one or more components of a respective one of the computing device 600.

The computing device 600 executes program code 630 that configures the processor 602 to perform one or more of the operations described herein. For example, the program code 630 causes the processor to perform the operations described in FIG. 4, 6, or 7.

The computing device 600 also includes a network interface device 610. The network interface device 610 includes any device or group of devices suitable for establishing a wired or wireless data connection to one or more data networks. The network interface device 610 may be a wireless device and have an antenna 614. The computing device 600 can communicate with one or more other computing devices implementing the computing device or other functionality via a data network using the network interface device 610.

The computing device 600 can also include a display device 612. Display device 612 can be a LCD, LED, touch-screen or other device operable to display information about the computing device 600. For example, information could include an operational status of the computing device, network status, etc.

General Considerations

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method of deploying application and tutorial content via a set of runtime tags, the method comprising:
    accessing an application object comprising an application segment and a first condition for displaying the application segment, wherein the application object represents a web page for a web-based application;
    accessing tutorial content comprising a content segment and a second condition for displaying the content segment, wherein the content segment comprises a tutorial for using the web-based application;
    generating, from the content segment, a tutorial object comprising code to display the content segment; and
    integrating the tutorial object and the application object into the set of runtime tags by:
        selecting a first tag and a second tag from a plurality of runtime tags that control operations of a website, wherein a performance of one of the operations of the website is the first condition and causes an execution of the first tag to occur;
        linking the first tag with the application object, wherein an execution of the first tag causes the application object to be loaded and executed by the website and the application segment to be displayed on a web page of the website; and
        linking the second tag with the tutorial object, wherein an execution of the second tag causes the tutorial object to be loaded and executed by the website and the content segment to be displayed on the web page; and
    deploying the set of runtime tags to the website.

2. The method of claim 1, wherein the tutorial content specifies one or more of an alignment, an anchor position, and a description that is applied when the web page is rendered and the second condition is met.

3. The method of claim 1, further comprising linking an additional tag with an analytics object, wherein the execution of the additional tag causes the analytics object to be loaded and executed by the website and a data object indicating the execution of the application object to be stored.

4. The method of claim 1, wherein one or more of the first condition and the second condition is met by an event that occurred on the web page.

5. The method of claim 4, wherein the event is an HTML event.

6. The method of claim 1, wherein the execution of the second tag further comprises responsive to determining that a visitor to the website is a return visitor, preventing the content segment from being displayed on the website.

7. The method of claim 1, further comprising:
    receiving, from a web browser, a request for the web page; and
    responsive to determining, via the web browser, that a tag was executed, identifying an object that corresponds to the tag and transmitting the object to the web browser, wherein tutorial content corresponding to the object is displayed.

8. The method of claim 1, wherein execution of the second tag occurs responsive to determining that a visitor to the website is a first time visitor.

9. A system comprising:
    one or more processing devices; and
    a non-transitory computer-readable medium communicatively coupled to the one or more processing devices, wherein the one or more processing devices are configured to execute instructions and thereby perform operations comprising:
        accessing an application object comprising an application segment and a first condition for displaying the application segment, wherein the application object represents a web page for a web-based application;
        accessing tutorial content comprising a content segment and a second condition for displaying the content segment, wherein the content segment comprises a tutorial for using the web-based application;

generating, from the content segment, a tutorial object comprising code to display the content segment; and integrating the tutorial object and the application object into a set of runtime tags by:
  selecting a first tag and a second tag from a plurality of runtime tags that control operations of a website, wherein a performance of one of the operations of the website is the first condition and causes an execution of the first tag to occur;
  linking the first tag with the application object, wherein an execution of the first tag causes the application object to be loaded and executed by the website and the application segment to be displayed on a web page of the website; and
  linking the second tag with the tutorial object, wherein an execution of the second tag causes the tutorial object to be loaded and executed by the website and the content segment to be displayed on the web page; and deploying the set of runtime tags to the website.

10. The system of claim 9, the operations further comprising:
  receiving, from a web browser, a request for the web page; and
  responsive to determining, via the web browser, that a tag was executed, identifying an object that corresponds to the tag and transmitting the object to the web browser, wherein tutorial content corresponding to the object is displayed.

11. The system of claim 9, wherein the tutorial content specifies one or more of an alignment, an anchor position, and a description that is applied when the web page is rendered and the second condition is met.

12. The system of claim 9, the operations further comprising linking an additional tag with an analytics object, wherein the execution of the additional tag causes the analytics object to be loaded and executed by the website and a data object indicating the execution of the application object to be stored.

13. The system of claim 9, wherein the second condition is met by an event that occurred on the web page.

14. The system of claim 13, wherein the event is an HTML event.

15. A non-transitory computer-readable medium having program code stored thereon that, when executed by one or more processing devices, causes the one or more processing devices to perform operations comprising:
  accessing an application object comprising an application segment and a first condition for displaying the application segment, wherein the application object represents a web page for a web-based application;
  accessing tutorial content comprising a content segment and a second condition for displaying the content segment, wherein the content segment comprises a tutorial for using the web-based application;
  generating, from the content segment, a tutorial object comprising code to display the content segment; and
  integrating the tutorial object and the application object into a set of runtime tags that control operations of a website by:
    selecting a first tag and a second tag from a plurality of runtime tags, wherein a performance of one of the operations of the website is the first condition and causes an execution of the first tag to occur;
    linking the first tag with the application object, wherein an execution of the first tag causes the application object to be loaded and executed by the website and the application segment to be displayed on a web page of the website; and
    linking the second tag with the tutorial object, wherein an execution of the second tag causes the tutorial object to be loaded and executed by the website and the content segment to be displayed on the web page; and
  deploying the set of runtime tags to the website.

16. The non-transitory computer-readable medium of claim 15, wherein the tutorial content specifies one or more of an alignment, an anchor position, and a description that is applied when the web page associated with tag is rendered and the second condition is met.

17. The non-transitory computer-readable medium of claim 15, the operations further comprising linking an additional tag with an analytics object, wherein the execution of the additional tag causes the analytics object to be loaded and executed by the website and a data object indicating the execution of the application object to be stored.

18. The non-transitory computer-readable medium of claim 15, wherein one or more of the first condition and the second condition is met by an event that occurred on the web page.

19. The non-transitory computer-readable medium of claim 15, wherein execution of the second tag occurs responsive to determining that a visitor to the website is a first time visitor.

* * * * *